United States Patent
Kwon

(10) Patent No.: US 7,175,324 B2
(45) Date of Patent: Feb. 13, 2007

(54) ILLUMINATED EXTERIOR DECORATIVE DEVICE

(76) Inventor: Young Chul Kwon, 12174 Woodley Ave., Granada Hills, CA (US) 91344

(*) Notice: Subject to any disclaimer, the term of this patent is extended or adjusted under 35 U.S.C. 154(b) by 0 days.

(21) Appl. No.: 11/158,204

(22) Filed: Jun. 22, 2005

(65) Prior Publication Data
US 2006/0291233 A1 Dec. 28, 2006

(51) Int. Cl.
*F21S 8/10* (2006.01)
(52) U.S. Cl. .................. 362/545; 362/540; 362/565
(58) Field of Classification Search ............... 362/545, 362/540
See application file for complete search history.

(56) References Cited

U.S. PATENT DOCUMENTS

| | | | | |
|---|---|---|---|---|
| 3,938,177 A * | 2/1976 | Hansen et al. | ............... | 257/98 |
| 5,241,457 A * | 8/1993 | Sasajima et al. | ........... | 362/503 |
| 5,249,104 A * | 9/1993 | Mizobe | ..................... | 362/605 |
| 5,516,387 A * | 5/1996 | Hoffman | ..................... | 156/70 |
| 6,023,414 A * | 2/2000 | Fujii | ........................ | 362/761 |
| 6,095,673 A * | 8/2000 | Goto et al. | ................. | 362/582 |
| 6,190,026 B1 * | 2/2001 | Moore | ........................ | 362/487 |
| 6,318,887 B1 * | 11/2001 | Matsumoto | ................. | 362/574 |
| 6,557,284 B2 * | 5/2003 | Nolan | ........................ | 40/574 |
| 6,595,671 B2 * | 7/2003 | Lefebvre et al. | ............ | 362/545 |
| 7,040,779 B2 * | 5/2006 | Lamke et al. | ............... | 362/231 |
| 2005/0001433 A1 * | 1/2005 | Seelin | ........................ | 290/44 |

* cited by examiner

*Primary Examiner*—Ali Alavi
*Assistant Examiner*—Hargobind S. Sawhney
(74) *Attorney, Agent, or Firm*—John K. Park; Park Law Firm

(57) ABSTRACT

An illuminated exterior decorative device for vehicles includes a decorative part and an illuminating part. The illuminating part illuminates the decorative part from behind and includes a light source and a light diffusion portion. The light source of the illuminating part is embedded in the light diffusion portion. The light diffusion portion of the illuminating part is optically transmissive, preferably transparent. The light source is disposed along the edge of the decorative part. The light source includes a plurality of light emitting device (LED). The illuminating part has substantially the same pattern as the decorative part. The decorative part may be provided as metal coating on the illuminating part.

1 Claim, 2 Drawing Sheets

ILLUMINATED EXTERIOR DECORATIVE DEVICE

BACKGROUND OF THE INVENTION

This invention is related to an illuminated exterior decorative device for vehicles including a decorative part for a vehicle trademark like an emblem, an illuminating part illuminating the decorative part at least partially, and a mounting part attaching the illuminated exterior decorative device to the vehicles.

The automobile is one of the indispensable necessities of modern every-day life. Both manufacturers and consumers of the automobile have felt it desirable to display some visual information somewhere on the surface of the vehicle for the purpose of advertisement and aesthetics since the advent of the era of automobile.

Emblem was one of the solutions to those kinds of needs. An emblem, a pattern used to represent an idea, usually visualizes a logo of manufacturers or a personal penchant. Such emblems have been attached on the front, side, and rear end of vehicle traditionally.

Conventionally, however, the emblems were passive elements in a sense that an external light with a certain minimum luminosity was needed to make the emblems visible. Under the condition of a bright daylight, there exist so many distraction. Especially, during the nighttime, the emblem was totally out of service.

Accordingly, a need for an illuminated exterior decorative device for vehicles was present since the advent of the car. This invention is directed to solve these problems and satisfy the long-felt need.

SUMMARY OF THE INVENTION

The present invention contrives to solve the disadvantages of the prior art.

An objective of the invention is to provide an illuminated exterior decorative device for vehicles, which maximizes the visibility of an emblem.

Another objective of the invention is to provide an illuminated exterior decorative device for vehicles, which is highly effective under a condition of low luminosity.

Still other objective of the invention is to provide an illuminated exterior decorative device for vehicles, which increases the visibility of the decorative pattern by controlling the color and luminance of the device.

The illuminated exterior decorative device for vehicles includes a decorative part and an illuminating part. The illuminating part is for illuminating the decorative part from behind, and includes a light source and a light diffusion portion. The light source of the illuminating part is embedded in the light diffusion portion.

The light diffusion portion of the illuminating part is optically transmissive, preferably transparent. The light source is disposed along the edge of the decorative part to make the light from the otherwise hidden light source more visible.

The light source comprises a plurality of light emitting device (LED). The illuminating part has substantially the same pattern as the decorative part, and the light emitting devices are disposed behind the decorative part with a predetermined interval.

The illuminating part further includes a top attaching portion, a bottom attaching portion, a control circuit, and two or move lead wires.

The top attaching portion is for attaching the illuminating part to the decorative part, and the bottom attaching portion for attaching the illuminating part to the vehicle. The control circuit is for controlling the operation of the light source. The two or more lead wires are for powering the light source and the control circuit.

The light emitting device changes the color and luminance as a predetermined function of time following the signals from the control circuit. The lead wire is optically transmissive, not obstructing the light beam.

The top attaching portion and the bottom attaching portion may include double-sided adhesive tapes.

The bottom attaching portion can include one or more magnets. The shape and size of the magnets are adapted to predetermined magnetic metal surfaces of the vehicle.

In the second embodiment of the invention, the decorative part includes a coating on the light diffusion portion.

Preferably, the coating comprises metal coating, and the light diffusion portion is made of plastic. More preferably, the metal coating includes chromium, and the light diffusion portion is made of ABS (Acrylonitrile butadiene styrene).

The illuminating part includes a base portion that is adapted to be fixed to a vehicle. The coating of the decorative part partially surrounds the cross-section of the illuminating part. Preferably, the height of coating from the base portion is higher in one side of the cross-section of the illuminating part than in the other side of the cross-section of the illuminating part.

The advantages of the present invention are: (1) the illuminated exterior decorative device displays the emblems much more outstanding; (2) the illuminated exterior decorative device is more visible by controlling the color, brightness, or blinking period of the light source; (3) the illuminated exterior decorative device is strong and resistant to an external shock since is embedded in the decorative part.

Many other innovations, features, and advantages will be evident with the following description of the invention. Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
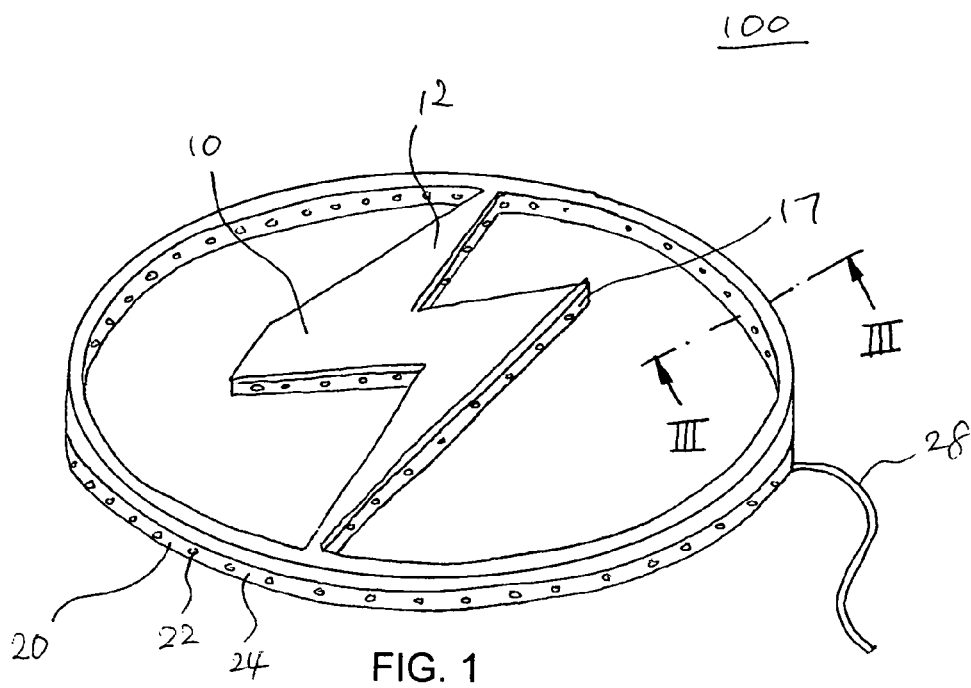
FIG. 1 is a perspective front view of an illuminated decorative device according to the present invention.
Figure 2:
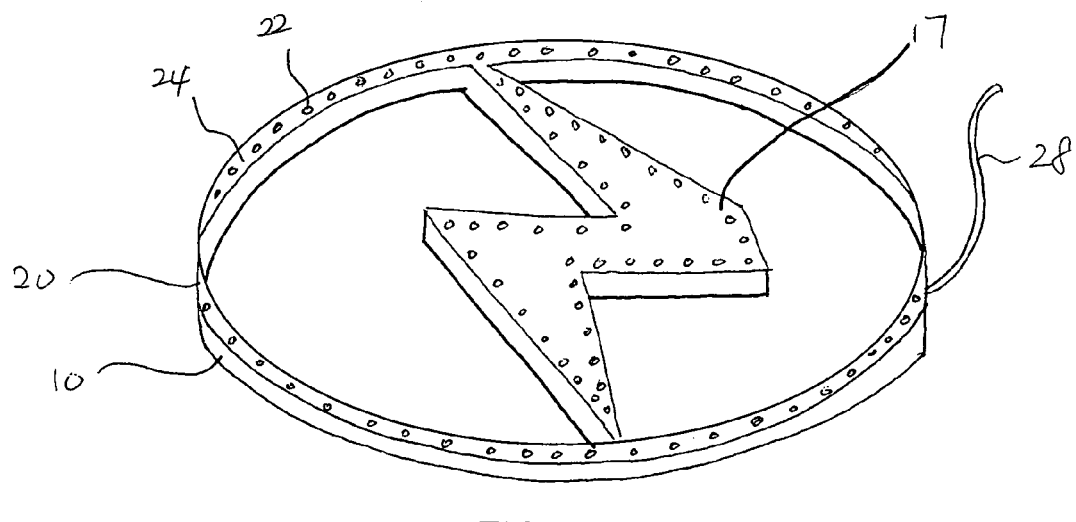
FIG. 2 is a perspective rear view of the illuminated decorative device.
Figure 3:
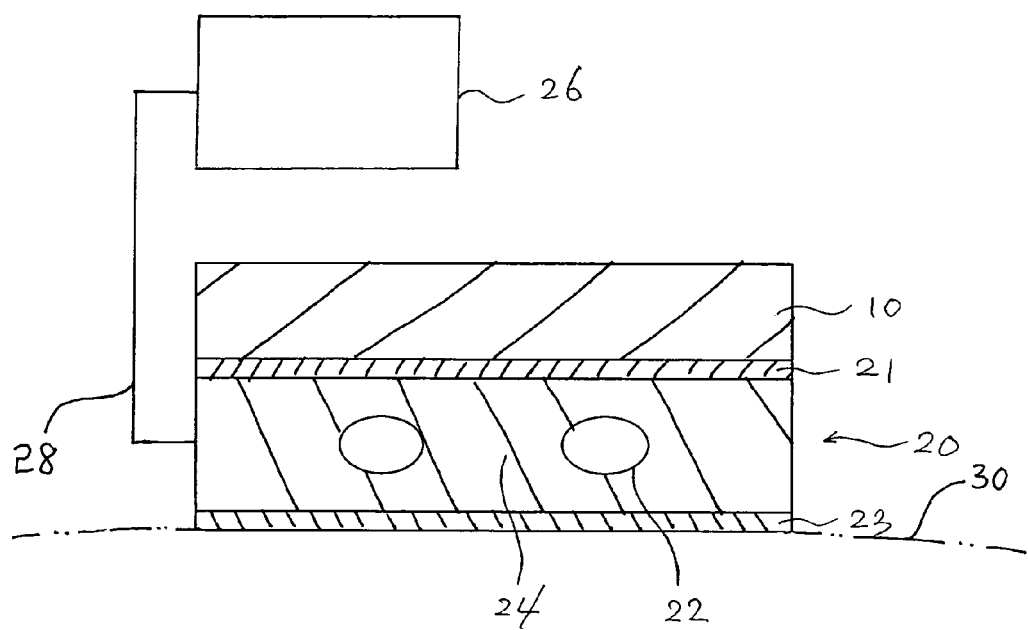
FIG. 3 is a cross-sectional view taken along line III—III in FIG. 1, showing a decorative part and an illuminating part of the illuminated decorative device.

FIG. 1 and FIG. 2 show the front and rear perspective view of an illuminated decorative device 100 according to the present invention. FIGS. 1~3 show the first embodiment of the present invention.

The illuminated exterior decorative device 100 for vehicles includes a decorative part 10 and an illuminating part 20. The illuminating part 20 is for illuminating the decorative part 10 from behind, and includes a light source 22 and a light diffusion portion 24.

The decorative part 10 is optically opaque, and the light source 22 of the illuminating part 20 is embedded in the light diffusion portion 24.

The light diffusion portion 24 of the illuminating part 20 is optically transmissive, preferably transparent. The light source 22 is disposed along the edge 17 of the decorative part 10 to make the light from the otherwise hidden light source 22 more visible.

The light source 22 includes a plurality of light emitting device (LED). The illuminating part 20 has substantially the same pattern as the decorative part 10, and the light emitting devices 22 are disposed behind the decorative part 10 with a predetermined interval.

As shown in FIG. 3, the illuminating part 20 further includes a top attaching portion 21, a bottom attaching portion 23, a control circuit 26, and two or move lead wires 28.

The top attaching portion 21 is for attaching the illuminating part 20 to the decorative part 10, and the bottom attaching portion 23 for attaching the illuminating part 20 to a vehicle 30. The control circuit 26 is for controlling the operation of the light source 22. The two or more lead wires 28 are for powering the light source 10 and the control circuit 26.

The light emitting device 22 changes the color and luminance as a predetermined function of time following the signals from the control circuit 26. The lead wire 28 extends through the light diffusion portion 24 to supply electrical power to the light source 22, and is optically transmissive, not obstructing the light beam.

The top attaching portion 21 and the bottom attaching portion 23 may include double-sided adhesive tapes.

Alternatively, the bottom attaching portion 23 can include one or more magnets. The shape and size of the magnets are adapted to predetermined magnetic metal surfaces of the vehicle.

Figure 4:
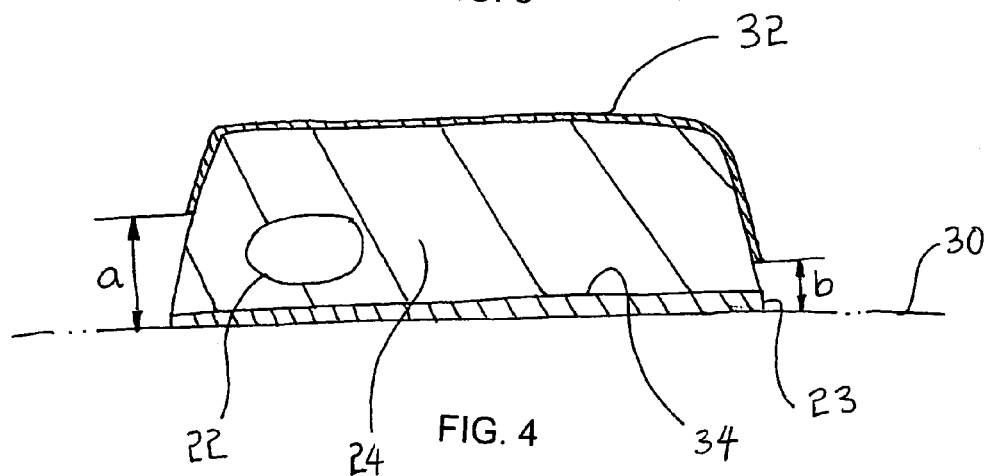
FIG. 4 is a cross-sectional view similar to FIG. 3, and showing another embodiment of the invention.

FIG. 4 illustrates a second embodiment of the present invention. In this embodiment, the decorative part 10 comprises a coating 32 on the light diffusion portion 24. In this way, the illuminated exterior decorative device is provided as a single part rather than two separate parts assembled as in the first embodiment.

The coating 32 includes metal coating, and the light diffusion portion 24 is made of plastic. Preferably, the metal coating comprises chromium, and the light diffusion portion is made of ABS.

The illuminating part comprises a base portion 34 that is adapted to be fixed to a vehicle 30. The coating 32 of the decorative part partially surrounds the cross-section of the illuminating part 20. The height of coating from the base portion is higher in one side (refer to height a in FIG. 4) of the cross-section of the illuminating part than in the other side (refer to height b in FIG. 4) of the cross-section of the illuminating part 20. This is advantageous in case of an emblem since an emblem usually forms a closed loop shape, and the transparent portion of the illuminating part 20 is adjusted bigger inside the closed shape by adjusting the height of the starting position of the coating 32 so that inside of the closed shape is illuminated brighter than the outer edge of the closed shape.

The invention is equally applicable to non-closed shape such as a lettering for an automobile. The illuminating part may be provided as a simple additional element below the decorating part as in the first embodiment, or as an integral part of an emblem or a lettering as in the second embodiment by providing the decorative part as a partial coating on an emblem or a lettering.

The U.S. patent application Ser. No. 11/009,604 by the applicant is incorporated by reference into this disclosure as if fully set forth herein.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An illuminated exterior decorative device for vehicles, comprising:
    a) a decorative part fixed to a vehicle; and
    b) an illuminating part for illuminating the decorative part from behind, having a light source and a light diffusion portion,
   wherein the light source of the illuminating part is embedded in the light diffusion portion, wherein the decorative part comprises a coating on the light diffusion portion, wherein the illuminating part comprises a base portion attached to the vehicle, wherein the coating of the decorative part partially surrounds the cross-section of the illuminating part, wherein the height of coating from the base portion is higher in one side of the cross-section of the illuminating part than in the other side of the cross-section of the illuminating part; two or more lead wires powering the light source isoptically transmissive.

* * * * *